United States Patent
Safta et al.

(10) Patent No.: US 6,436,159 B1
(45) Date of Patent: Aug. 20, 2002

(54) ABRASION RESISTANT COATINGS

(75) Inventors: Eugen Safta, Winston-Salem; Frank Bor-Her Chen, Greensboro; Harvey Richard Forrest, Lexington; Gregory David Muselman, Greensboro, all of NC (US)

(73) Assignee: Lilly Industries, Inc., Indianapolis, IN (US)

( * ) Notice: Subject to any disclaimer, the term of this patent is extended or adjusted under 35 U.S.C. 154(b) by 0 days.

(21) Appl. No.: 09/733,782

(22) Filed: Dec. 8, 2000

Related U.S. Application Data

(60) Provisional application No. 60/169,882, filed on Dec. 9, 1999, and provisional application No. 60/199,543, filed on Apr. 25, 2000.

(51) Int. Cl.⁷ .............................. C09D 1/00; C09D 5/00
(52) U.S. Cl. .............................. 51/298; 51/300; 51/308; 51/309; 428/908.8; 428/148; 428/149; 428/151; 428/147; 428/206; 428/211; 428/323; 428/329; 428/457; 428/537.1; 428/537.5; 428/524; 428/525; 428/528; 428/530; 428/142; 428/327; 428/210; 428/503; 428/918; 428/703; 428/704; 427/402; 427/419.1; 427/419.2; 524/430; 524/493; 524/492; 106/204.3; 106/204.01; 106/287.17; 106/287.34
(58) Field of Search ................ 51/293, 298, 300, 51/308, 309; 106/204.3, 204.01, 287.17, 287.34; 428/908.8, 148, 149, 150, 151, 147, 142, 206, 211, 323, 329, 457, 537.1, 537.5, 524, 525, 528, 530, 327, 210, 503, 918, 703, 704; 427/402, 419.1, 419.2; 524/430, 493, 492

(56) References Cited

U.S. PATENT DOCUMENTS

| | | | |
|---|---|---|---|
| 3,876,579 A | * 4/1975 | Hallstrom et al. | 51/298 |
| 3,990,926 A | 11/1976 | Konicek | |
| 4,023,998 A | 5/1977 | Cederberg | |
| 4,075,757 A | 2/1978 | Malm | |
| RE29,820 E | 10/1978 | Konicek | |
| 4,162,932 A | 7/1979 | Konicek | |
| 4,356,037 A | * 10/1982 | Novak | 106/209 |
| 4,520,062 A | * 5/1985 | Ungar et al. | 428/148 |
| 4,940,503 A | 7/1990 | Lindgren et al. | |
| 5,034,272 A | 7/1991 | Lindgren et al. | |
| 5,098,938 A | 3/1992 | Savin | |
| 5,470,368 A | * 11/1995 | Culler | 51/308 |
| 5,744,220 A | 4/1998 | Ringo | |
| 5,788,103 A | 8/1998 | Wagner et al. | |
| 5,861,055 A | 1/1999 | Allman et al. | |
| 5,914,299 A | 6/1999 | Harmer et al. | |
| 5,928,394 A | * 7/1999 | Stoetzel | 51/295 |
| 5,975,988 A | * 11/1999 | Christianson | 51/295 |
| 6,056,794 A | * 5/2000 | Stoetzel et al. | 51/298 |
| 6,124,393 A | 9/2000 | Haraguchi et al. | |

FOREIGN PATENT DOCUMENTS

| | | |
|---|---|---|
| EP | 0 105 411 A2 | 4/1984 |
| EP | 0 355 829 A2 | 2/1990 |
| EP | 0 515 529 B1 | 8/1991 |
| EP | 0 380 636 B1 | 1/1992 |
| EP | 0 329 154 B1 | 11/1993 |
| EP | 0 590 693 A2 | 4/1994 |
| EP | 0 592 013 A2 | 4/1994 |
| EP | 0 355 829 B1 | 7/1994 |
| EP | 0 619 216 A2 | 10/1994 |
| EP | 0 592 573 B1 | 9/1996 |
| EP | 0 619 216 B1 | 9/1996 |
| EP | 0 649 368 B1 | 9/1997 |
| EP | 0 590 693 B1 | 3/1999 |
| WO | 9700172 | 1/1997 |
| WO | 9713626 | 4/1997 |
| WO | 9717214 | 5/1997 |
| WO | 9731775 | 9/1997 |
| WO | 9731776 | 9/1997 |
| WO | 9822678 | 5/1998 |
| WO | 9840196 | 9/1998 |
| WO | 9850207 | 11/1998 |
| WO | 9901629 | 1/1999 |
| WO | 9912736 | 3/1999 |

OTHER PUBLICATIONS

"Perstorp Flooring Covers New Buyers for Pergo Brand," Precision Marketing (1997) p. 3 (No month).

* cited by examiner

*Primary Examiner*—Michael Marcheschi
(74) *Attorney, Agent, or Firm*—Barnes & Thornburg

(57) ABSTRACT

A coating composition for forming abrasion-resistant, high clarity coatings is described. It has been found that a macrocrystalline or single crystal mineral abrasive can be added at high levels, about 5 to about 80 percent by weight, to art-recognized film-forming resin compositions for producing coatings exhibiting exceptional abrasion resistance and clarity. Such a coating composition is useful for application to surfaces including wood, vinyl, tile, rubber modified cement, marble, metal, plastic, and laminated surfaces.

29 Claims, No Drawings

US 6,436,159 B1

ABRASION RESISTANT COATINGS

CROSS REFERENCE TO RELATED APPLICATIONS

This application claims priority under 35 U.S.C. §119(e) to U.S. Provisional Application Serial No. 60/169,882, filed Dec. 9, 1999, and to U.S. Provisional Application Serial No. 60/199,543, filed Apr. 25, 2000, which are expressly incorporated herein by reference.

FIELD OF THE INVENTION

This invention relates to a composition and method for forming abrasion resistant coatings. More particularly, this invention is directed to novel coating compositions containing a macrocrystalline or single crystalline mineral material in amounts sufficient to provide coatings exhibiting enhanced abrasion resistance and high clarity.

BACKGROUND AND SUMMARY OF THE INVENTION

The application of protective or decorative coatings is a common processing step in many manufacturing protocols. One important functional property of such coatings, whether they be applied for a decorative or a protective function, is abrasion resistance. Disruption of the integrity of the applied coatings by abrasive contact with other surfaces during shipment or in the ordinary use of the coated surfaces can affect the appearance of the coatings and their effectiveness in protecting the underlying surface. Accordingly, there has been a significant research and development effort directed to the formulation of coating compositions which exhibit abrasion resistance along with other desirable coating characteristics such as flexibility, hardness, adhesion, high clarity, and the like.

Abrasion resistance is a particularly important and desirable property for coating formulations used on surfaces, such as flooring, shelving, wall coverings, furniture, and the like, which in use are subjected to abrasive contacts with other objects. The use of coatings exhibiting good abrasion resistance and high clarity on such surfaces enhances both the appearance and the functionality of the coating compositions.

Therefore, in accordance with this invention there is provided a coating composition for forming abrasion resistant coatings. The invention is based, at least in part, on the discovery that the use of a macrocrystalline or single crystalline mineral material having an average crystal size of about 1 to about 500 microns as an additive at effective levels in available resin coating compositions provides coatings exhibiting surprisingly enhanced abrasion resistance and excellent coating clarity.

Typical coating compositions in accordance with this invention comprise a film-forming resin composition and a mineral abrasive in a macrocrystalline or single crystalline form in an amount effective to provide abrasion resistance in the resulting coating. The nature of the film-forming resin component of the present coating composition is not critical; preferably, however, the resins are art-recognized thermosetting and UV curable resins commonly used in decorative and protective coating compositions.

In one embodiment of the present invention improved abrasion resistant surface finishes are applied in a multi-coat coating protocol utilizing at least one sealer or primer coating composition and at least one top coat composition to form a surface top coat. The improved surface finish and method comprises using a sealer/primer coating composition comprising a film-forming resin composition and a macrocrystalline or single crystalline mineral abrasive, for example, aluminum oxide or silicon dioxide, in an amount effective to impart abrasion resistance to the surface finish.

In another embodiment of the present invention an abrasion-resistant laminate is provided. The laminate comprises a base layer and at least one additional layer wherein the surface of the additional layer is finished with a coating composition comprising a film-forming resin composition and a macrocrystalline or single crystalline mineral abrasive in an amount effective to impart abrasion resistance to the surface finish. The decorative flooring may be coated with a composition wherein the mineral abrasive is an aluminum oxide, an electrofused aluminum oxide, or a silicon dioxide. The aluminum oxide or silicon dioxide forms about 5 to about 80 weight percent of the coating.

In another embodiment of the present invention a method of finishing the surface of a laminate is provided. The method comprises the step of applying to at least one layer of the laminate a coating composition comprising a film-forming resin composition and a macrocrystalline or single crystalline mineral abrasive in an amount effective to impart abrasion resistance to the surface finish.

In still another embodiment of the invention improved abrasion resistant surface finishes are applied to the surface of at least one layer of a laminate. The improved surface finish and method comprise applying a coating composition to at least one layer of the laminate wherein the improved coating composition comprises a film-forming resin composition and a macrocrystalline or single crystalline mineral abrasive in an amount effective to impart abrasion resistance to the surface finish.

In yet another embodiment of the invention a coating composition for forming abrasion-resistant coatings of high clarity is provided. The coating composition comprises a film-forming resin composition and a mineral abrasive in macrocrystalline or single crystalline form wherein the mineral abrasive forms about 5 up to about 60 weight percent of the coating and wherein the coating composition exhibits about 70 percent clarity measured according to the ASTM® E430 Standard.

DETAILED DESCRIPTION OF THE INVENTION

In accordance with one embodiment of this invention there is provided a curable coating composition for forming abrasion-resistant, high clarity coatings. The coating composition comprises a film-forming resin composition, most typically a thermosetting resin or a UV curable resin, and a mineral abrasive with high Mohs' hardness in macrocrystalline or single crystalline form in an amount effective to enhance the abrasion resistance of the resulting cured coatings. The nature of the film-forming resin composition is not a critical aspect of the present invention; any art-recognized coating compositions detailed for decorative or surface protective applications can be formulated to include an amount of a macrocrystalline or single crystalline mineral abrasive sufficient to enhance the abrasion resistance in the resulting coatings.

In one embodiment of the invention the film-forming resin of the present coating composition is a thermosetting resin composition comprising epoxy resins, acrylic resins, polyester resins, polycarbonate resins, melamine-formaldehyde resins, or polyurethane resins. The resins may comprise polymers cross-linked through the use of aminoplasts. Such resins are well known in the art and are commercially available and are detailed for a wide range of decorative and protective coating applications.

In another embodiment of the invention the film-forming resin composition comprises a UV curable resin, typically a UV curable resin comprising olefin-functional monomers and olefin-functional oligomers and polymers. The olefin-functional oligomers and polymers may comprise polyurethanes, cellulosic acrylic butyrates, nitrocellulosic polymers, polyesters, acrylic polymers, or blended or grafted combinations thereof. Typically such formulations include a combination of mono- and multi-functional olefin oligomers or polymers. See, for example, the disclosures of U.S. Pat. Nos. 4,600,649; 4,902,975; 4,900,763; and 4,065,587, the disclosures of which are incorporated herein by reference. In one preferred embodiment of the invention there is provided a coating for forming abrasion resistant coating compositions, for example, for wood floor applications or for application to laminated floorings, wherein the coating composition comprises mono-olefin functional and multi-olefin functional polyurethane monomers, oligomers and polymers.

In another embodiment of the invention the film-forming resin comprises a thermalplastic resin. The thermalplastic resin may comprise such resins as a nitrocellulose resin, an alkyd resin, a polyester resin, an acrylic resin, a vinyl acrylic resin, a styrene acrylic resin, or may comprise a urethane, or a natural product.

Typically the present coating compositions comprise about 40 to about 90 percent by weight of a film-forming resin composition and about 5 to about 80 weight percent of a macrocrystalline or single crystalline mineral, typically a mineral abrasive such as aluminum oxide or a mineral abrasive that is a clear inorganic mineral such as silicon dioxide. Of course, such coating compositions can, and typically do, include other standard coating additives such as resin-dependent curing agents or catalysts, flow aids, wetting agents, dispersing agents, pigments and rheology modifiers. Thus, for example, coating compositions of this invention utilizing UV curable resins typically include effective amounts (about 0.1 to about 3 percent by weight) of one or more photoinitiators. Such compositions can be cured by electron beam irradiation without photoinitiators.

The invention is based, at least in part, on the discovery that the use of the macrocrystalline or single crystalline mineral abrasive with a crystal size of about 1 micron to about 500 microns in an effective amount provides coatings exhibiting surprisingly enhanced abrasion resistance and high clarity. Although a crystal size of about 1 to about 500 microns may be used in accordance with the invention, a crystal size of about 1 to about 80 microns is preferable, and, more preferably, the crystal size is about 5 to about 60 microns.

The degree of haze or clarity is measured by using the ASTM® Standard and high clarity is about 70 percent clarity or higher measured according to the ASTM® E430 Standard. A coating composition of the present invention wherein the degree of clarity is about 70 percent measured according to the ASTM® E430 Standard can contain up to about 60 percent by weight of the mineral abrasive. When a wood surface is used as the substrate for the coating composition, the degree of clarity varies with the type of wood substrate. For example, if oak or pine is used the tolerance to haze is increased and the degree of clarity may also increase.

The mineral component of the present coating compositions comprises a macrocrystalline or single crystal mineral abrasive, such as aluminum oxide or silicon dioxide. These products are commercially available. For example, in one embodiment of the invention the aluminum oxide is a product sold by the Elfusa Corporation under the name ALOMAX™. In a preferred embodiment of the invention, the mineral abrasive, such as aluminum oxide, is electrofused. The manufacture and electrofusion of mineral abrasives such as aluminum oxide, or mineral abrasives that are clear inorganic minerals such as silicon dioxide, are generally well known in the art.

Mineral abrasives for use in accordance with this invention are, as mentioned above, available commercially. Such compositions are often specified, inter alia, by particle size, and the particle sizes used in the invention range from about 1 micron to about 500 microns. The mineral abrasive component of the present composition can be of a homogeneous particle size or several particle sizes in combination. The mineral abrasives are also specified by hardness as measured according to the Mohs' scale of hardness, and the mineral abrasives used should exhibit high Mohs' hardness of about 6 or greater.

In one embodiment of the present invention, the mineral abrasive forms about 5 to about 80 percent by weight of the coating. Sealer coats/primer coats in accordance with the present invention typically have higher weight percentages of the mineral abrasive composition than mineral abrasive-filled top coat compositions. Top coat compositions are usually formulated to contain about 5 to about 20 percent of the mineral abrasive while sealer/primer coat compositions are most typically formulated to contain about 5 to about 80 percent by weight of the mineral abrasive. The level of gloss of the coating composition decreases as the percent by weight of the mineral abrasive in the coating is decreased, and the level of gloss also decreases as the particle size of the mineral abrasive is increased.

The coating compositions of the present invention are applied using art-recognized coating application techniques including spray coating, brush coating, curtain coating, direct or differential roll coating applications, or the surface to be coated can be impregnated with the coating composition by immersion in a bath containing the coating composition. The coating composition can be applied to a surface such as a wood surface, a vinyl surface, a tile surface, a rubber modified cement surface, a marble surface, a metal surface, a plastic surface, or the surface of a laminated wall covering, flooring, or piece of furniture, and the like. The viscosity of the coating compositions can range from about 200 centipoise (0.2 Pa·s) up to about 8000 centipoise (8 Pa·s) depending on the degree of loading of the mineral abrasive and the nature of the film-forming resin components of the composition. The compositions are prepared utilizing standard coating formulation techniques. Indeed, the mineral abrasive composition can be mixed with a standard commercially available coating composition without compromise of appearance, ease of application, or other coating properties. Thus, the mineral abrasive composition can be blended into, for example, floor finishing compositions or standard coil coat compositions for providing coatings with enhanced abrasion resistance without compromise of other functionally significant properties such as flexibility, hardness, adhesion and the like.

In one embodiment of the invention the coating compositions are applied to laminates which are used, for example, for flooring or to cover walls or tops of furniture, such as desks, tables, and other furniture. Typically, laminates provide a decorative effect and comprise a base layer and at least one patterned paper sheet to provide the decorative effect wherein the patterned paper sheet is finished with a coating composition that imparts abrasion resistance to the surface finish. The patterned paper sheet may be firmly bonded to the base layer, by using an adhesive such as glue, or the like. Although laminates typically provide a decorative effect, non-decorative laminates are also provided in accordance with the present invention.

The laminate may contain more than one patterned paper sheet wherein the sheets are placed on top of each other to displace the pattern underneath so that additional layers will be available when the uppermost layer wears through. Multi-layered laminates are often made by laminating layers together by curing under heat and pressure. Further, the laminate may contain unpatterned, transparent paper sheets, and may contain at least one transparent paper sheet which constitutes the top layer, or overlay, of the laminate. The overlay is intended to protect the decorative paper sheets from abrasion, but in certain cases the overlay sheet may be omitted. At least one of the patterned or unpatterned paper sheets is finished with the coating composition of the present invention providing enhanced abrasion resistance and high clarity.

The base layer may consist of such material as particle board, fibre board, or fiberglass and if an overlay layer is present, the overlay may consist of α-cellulose. One patterned paper sheet may be firmly bonded to the base layer, by using an adhesive such as glue, or the like. Additional unpatterned or patterned paper sheets, including an overlay sheet, may be impregnated with a resin, such as a melamine-formaldehyde resin, by immersion in a bath containing the resin. A resin such as a melamine-formaldehyde resin is capable of being partially cross-linked following application to the sheets and then completely cross-linked when the sheets are layered and subjected to heat and pressure. Thus, the resin acts as a "glue" to bond the layers together. A resin such as a melamine-formaldehyde resin may be used in combination with high fiber cotton paper and causes the high fiber cotton paper to become transparent. Multi-layered laminates are often made by laminating layers together by curing under heat and pressure.

In one embodiment of the invention the base layer may be protected from water/moisture by bonding a barrier layer to the base layer. For example, a melamine-formaldehyde impregnated paper sheet may be used as a water/moisture barrier layer for the base layer, such as a particle board base layer.

At least one of the patterned or unpatterned paper sheets is finished with a coating composition comprising a film-forming resin composition and a macrocrystalline or single crystalline mineral abrasive in an amount effective to impart abrasion resistance to the surface finish. Thus, it is possible to apply the coating composition to one or more decorative paper sheets and/or one or more overlay layers. Generally, the coating composition is applied to the upper side of the laminate to provide the best abrasion resistance. However, the coating composition may be applied to the under side of a decorative layer or an overlay layer to increase abrasion resistance between layers of the laminate.

In accordance with another embodiment of the invention there is provided a method of finishing the surface of a laminate comprising the step of applying to at least one layer of the laminate a coating composition comprising a film-forming resin composition and a macrocrystalline or single crystalline mineral abrasive in an amount effective to impart abrasion resistance to the surface finish. For example, such a method may comprise applying the coating composition hereinbefore described to at least one side of a continuous decorative paper over the whole surface of the continuous paper. Thereinafter the resin is dried and the particle-coated paper is cut into sheets. At least one such sheet is placed as a layer on a base layer or another paper sheet and is bonded thereto.

The coating composition of the present invention may also be applied to a wood veneer flooring, for example, a flooring consisting of a single wood veneer layer and an overlay paper sheet. Alternatively, the wood veneer flooring may be multi-layered consisting of multiple wood veneer layers and an overlay sheet. The coating composition may be applied to each layer of the wood veneer flooring or may be applied only to the overlay sheet. A melamine-formaldehyde resin applied by brush coating, or another art-recognized application method, may be used to "glue" the wood veneer layers to one another, and the overlay sheet may be impregnated with melamine-formaldehyde resin containing the mineral abrasive and may be bonded to the underlying layers.

Most surface finishing protocols comprise the steps of applying at least one sealer/primer coating composition to form a sealer/primer coat and one top coating composition to form a surface top coat. The finished surfaces can be prepared to have improved abrasion resistance using an improved sealer coating or top coating composition in accordance with this invention, i.e., one comprising a film-forming resin composition and a macrocrystalline or single crystalline mineral abrasive in an amount effective to impart abrasion resistance to the sealer coat. In some coating protocols, for example, those used in applying coatings for wood flooring, the wood surface is coated with at least two sealer coats. More typically, two to five sealer coats are applied prior to application of one or more top coat compositions. The surface finish can be formed to have exceptional abrasion resistance and high clarity wherein, during the coating process, at least one of the applied sealer coats is a mineral abrasive filled coating composition of the present invention. In one embodiment, at least two sealer coats of the present invention are applied to the surface before application of the top coat.

In still another embodiment of this invention, the top coat is a mineral abrasive filled coating composition in accordance with this invention. Top coat formulations typically are formulated to contain lower levels of mineral abrasive than the surface coat, generally in the range of about 5 to about 20 percent by weight of mineral abrasive. In one embodiment, the surface being coated is a wood surface intended for use in flooring applications and the film-forming resin composition of both the sealer and top coats are UV-curable 100 percent solids compositions comprising a combination of mono-olefin functional and multi-olefin functional monomers, oligomers and polymers.

EXAMPLE 1

Conventional Lacquer Formulation

The following represents the composition and performance characteristics of a conventional lacquer formulation:

| Formulation 1 Conventional Nitrocellulose Lacquer | |
|---|---|
| Component | Weight % |
| CALUMET ™ 210–245 | 4.856 |
| Toluol | 7.811 |
| Xylene | 4.093 |
| Naptha | 6.173 |
| Isobutyl Alcohol | 9.913 |
| Isopropanol | 5.155 |
| Solvent Blend | 22.192 |
| Bubble Breaker | 0.471 |
| Silicon solution | 0.144 |
| Nitrocellulose | 13.543 |
| Isobutyl Isobutrlyrate | 7.364 |
| Methylethyl Ketone | 4.532 |
| Alkyd resin | 7.122 |
| Soybean Oil | 3.649 |
| Plasticizer | 2.963 |
| Phosphoric Acid | 0.019 |

EXAMPLE 2

Nitrocellulose Laquer Formulation Containing Sol Gel Processed Aluminum Oxide

The composition of a formulation, containing a sol gel processed alumina grain (CUBITRON® 2000 brand aluminum oxide) and performance characteristics of the composition are provided for comparison with a composition containing macrocrystalline aluminum oxide.

Formulation 2 (with CUBITRON® 2000 brand aluminum oxide) (70 weight % Formulation 1 and 30 weight % CUBITRON® 2000 brand aluminum oxide)

| Formulation 2 Performance | |
|---|---|
| Clarity | Hazy |
| Scratch Resistance | Moderate |
| Abrasion Resistance | 25 cycles/mil ($2.54 \times 10^{-5}$ meters) |

EXAMPLE 3

Nitrocellulose Laquer Formulation Containing Macrocrystalline Aluminum Oxide

The following are the composition and performance characteristics of a formulation containing macrocrystalline aluminum oxide (ALOMAX™ 500 brand aluminum oxide):

Formulation 3 (with ALOMAX™ 500 brand aluminum oxide) (70 weight % Formulation 1 and 30 weight % ALOMAX™ 500 brand aluminum oxide)

| Formulation 3 Performance | |
|---|---|
| Clarity | Clear |
| Scratch Resistance | Good |
| Abrasion Resistance | 38 cycles/mil ($2.54 \times 10^{-5}$ meters) |

EXAMPLE 4

Acid-Catalyzed Laquer Formulation

The following are the composition and performance characteristics of an acid-catalyzed lacquer:

| Formulation 4 Acid-Catalyzed Lacquer | |
|---|---|
| Component | Weight % |
| Alkyd | 28.776 |
| Urea Resin (Beetle) | 15.669 |
| Xylene | 8.934 |
| Isobutyl Alcohol | 1.492 |
| Melamine | 3.197 |
| BYK ® 320 | 0.150 |
| BYK ® 306 | 0.100 |
| PM Acetate | 4.144 |
| Butyl Acetate | 6.210 |
| Methyl Isobutyl Ketone | 2.444 |
| Aromatic Hydrocarbon | 1.974 |
| Toluene | 6.535 |
| Ethyl Alcohol | 7.403 |
| Acetone | 12.911 |
| TINUVIN ® 99 | 0.165 |

EXAMPLE 5

Acid-Catalyzed Laquer Containing Sol Gel Processed Aluminum Oxide

The composition of an acid-catalyzed lacquer formulation containing a sol gel processed alumina grain and performance characteristics of the composition are provided for comparison with a similar composition containing macrocrystalline aluminum oxide.

Formulation 5 (with CUBITRON® 2000 brand aluminum oxide) (70 weight % Formulation 4 and 30 weight % CUBITRON® 2000 brand aluminum oxide)

| Formulation 5 Performance | |
|---|---|
| Clarity | Clear |
| Scratch Resistance | Good |
| Abrasion Resistance | 62 cycles/mil ($2.54 \times 10^{-5}$ meters) |

EXAMPLE 6

Acid-Catalyzed Laquer Formulation Containing Macrocrystalline Aluminum Oxide

The following are the composition and performance characteristics of an acid-catalyzed lacquer formulation containing macrocrystalline aluminum oxide (ALOMAX™ 500 brand aluminum oxide):

Formulation 6 (with ALOMAX™ 500 brand aluminum oxide) (70 weight % Formulation 4 and 30 weight % ALOMAX™ 500)

| Formulation 6 Performance | |
|---|---|
| Clarity | Clear |
| Scratch Resistance | Good |
| Abrasion Resistance | 80 cycles/mil ($2.54 \times 10^{-5}$ meters) |

EXAMPLE 7

Conventional UV Flooring Composition

The following are the composition and performance characteristics of a conventional UV flooring formulation:

| Formulation 7 Conventional UV Flooring | |
|---|---|
| Component | Weight % |
| PHOTOMER ® 4149 (Sartomer) | 10.90 |
| V PYROL ® (Sartomer) | 11.50 |
| Monomer ODA (Sartomer) | 2.54 |
| SARTOMER ® CN 292 | 5.69 |
| PHOTOMER ® 3016-20R (Sartomer) | 5.60 |
| DARCURE ® 1173 (Ciba-Geigy) | 3.00 |
| BYK ® P105 | 1.20 |
| SARTOMER ® CN 791A80 | 57.80 |
| Benzophenone (Ciba-Geigy) | 1.77 |

EXAMPLE 8

UV Flooring Composition Containing Sol Gel Processed Aluminum Oxide

The composition of a conventional UV flooring formulation containing a sol gel processed alumina grain and performance characteristics of the composition are provided for comparison with similar compositions containing conventional aluminum oxide (aluminum oxide F-360) or macrocrystalline aluminum oxide (ALOMAX™ 220 brand aluminum oxide):

Formulation 8 (with CUBITRON®320 brand aluminum oxide) (70 weight % Formulation 7 and 30 weight % CUBITRON® 320 brand aluminum oxide)

| Formulation 8 Performance | |
|---|---|
| Clarity | Hazy |
| Scratch Resistance | Moderate |
| Abrasion Resistance | 289 cycles/mil (2.54 × 10$^{-5}$ meters) |

EXAMPLE 9

UV Flooring Composition Containing Conventional Aluminum Oxide

The following (formulations 9 and 10) are the compositions and performance characteristics of conventional UV flooring formulations containing conventional aluminum oxide (aluminum oxide F 360) or macrocrystalline aluminum oxide (ALOMAX™ 220 brand aluminum oxide):

Formulation 9 (with Aluminum Oxide F 360) (70 weight % Formulation 7 and 30 weight % Aluminum Oxide F360)

| Formulation 9 Performance | |
|---|---|
| Clarity | Hazy |
| Scratch Resistance | Moderate |
| Abrasion Resistance | 56 cycles/mil (2.54 × 10$^{-5}$ meters) |

EXAMPLE 10

UV Flooring Composition Containing Macrocrystalline Aluminum Oxide

Formulation 10 (with ALOMAX™ 220 brand aluminum oxide) (70 weight % Formulation 7 and 30 weight % ALOMAX™ 220 brand aluminum oxide)

| Formulation 10 Performance | |
|---|---|
| Clarity | Clear |
| Scratch Resistance | Good |
| Abrasion Resistance | 800 cycles/mil (2.54 × 10$^{-5}$ meters) |

The clarity of the dry coating film can be further improved if the macrocrystalline abrasive mineral (ALOMAX™ 220 brand aluminum oxide) is washed with a conventional mineral cleansing acid, such as oxalic acid solution.

EXAMPLE 11

Application of UV Coating Composition Containing Macrocrystalline Aluminum Oxide to Laminated Floorings A UV coating composition containing macrocrystalline aluminum oxide (ALOMAX™ 220 brand aluminum oxide) is prepared as in formulation 10 described above. The coating composition containing macrocrystalline aluminum oxide is applied to a PERGO® laminated flooring comprising a base layer, two. decorative paper sheets, and an overlay layer. The macrocrystalline aluminum oxide-containing formulation is applied by spray coating to one side of a continuous paper sheet and to one side of a continuous overlay layer. The continuous decorative sheet and the continuous overlay layer are cut to the size of the base layer and one coated decorative sheet is bonded to the base layer using an adhesive. The second decorative sheet and the overlay layer are bonded to the first decorative sheet and base layer by curing under heat and pressure. The abrasion resistance of the coated flooring is tested using a TABER® Abraser equipped with 3M CS-42 sandpaper and at 1,000 g load weight and the abrasion resistance is found to be higher than flooring coated with an aluminum oxide F360-containing or a CUBITRON® 320 brand aluminum oxide-containing composition. The macrocrystalline aluminum oxide-containing coating composition also exhibits high clarity and good scratch resistance.

EXAMPLE 12

Application of a Coating Composition Containing Melamine Formaldehyde Resin and Macrocrystalline Aluminum Oxide to Laminated Floorings A coating composition containing melamine-formaldehyde resin and macrocrystalline aluminum oxide (ALOMAX™ 220 brand aluminum oxide) is prepared. To prepare this formulation the resin and the mineral abrasive are mixed in water, in a weight ratio of about 7 to 3 with the mineral abrasive comprising about 40 weight percent of the coating. The water is heated at 140° F. (60° C.) before dispersing the melamine-formaldehyde resin and macrocrystalline aluminum oxide into the water. The layers of a laminated flooring are then coated with a composition containing the resin alone or the resin and the mineral abrasive. Exemplary of a laminated flooring coated with this composition is the following four-layered flooring:

1. high density particle board base layer;
2. melamine-formaldehyde impregnated paper as a water/moisture barrier for the particle board base layer;
3. printed paper impregnated with melamine-formaldehyde resin for color and style design; and 4. high cotton fiber paper saturated with melamine-formaldehyde resin containing macrocrystalline aluminum oxide for wear protection.

To prepare these layers the high fiber cotton paper for wear protection is saturated with the above-described melamine-formaldehyde formulation by running the paper through a bath containing the formulation. The paper is then dried in an oven to about 200° F. (93° C.) to 250° F. (121° C.) for a short period (e.g., 10 seconds) to partially cross-link the melamine-formaldehyde resin. Additional sheets of paper including paper used as a water/moisture barrier for the particle board base layer and printed paper used for color and style design are similarly saturated with the melamine-formaldehyde resin formulation described above, but lacking macrocrystalline aluminum oxide.

The four sheets are sequentially layered and the composite is pressed in a hot press at about 440° F. (226° C.) under about 500 psi (3.45 MPa) to make the laminated flooring. The laminated flooring exhibits excellent abrasion resistance and high clarity.

EXAMPLE 13

Application of Melamine-Formaldehyde Resin Containing Macrocrystalline Aluminum Oxide to a Wood Veneer Flooring An melamine-formaldehyde resin containing macrocrystalline aluminum oxide is prepared as is described in Example 3. Exemplary of a wood veneer flooring coated with this composition is the following six-layered flooring:

1. an oak veneer;
2. an oak veneer;
3. an oak veneer;
4. an oak veneer;
5. a prestained, presealed oak veneer; and
6. paper saturated with melamine-formaldehyde resin containing macrocrystalline aluminum oxide for wear protection.

The high fiber cotton paper is impregnated with the coating composition as described in Example 3. The five oak veneer layers are cross-layered for dimensional stability to prevent cracking, for example, upon exposure to moisture, by layering such that the wood grain patterns of each of the five layers are perpendicular to each other. The oak veneer layers are glued together by using a melamine-formaldehyde resin-based glue. The composite layers are pressed under heat (about 440° F. (226° C.)) and pressure (about 500 psi (3.45 MPa)) to make the parquet veneer flooring. The veneer flooring exhibits excellent abrasion resistance and high clarity.

What is claimed is:

1. A coating composition for forming abrasion-resistant coatings of about 70% clarity or higher as measured by the ASTM® E430 Standard on a substrate, said coating composition comprising a film-forming resin composition and about 5 to about 80 percent by weight of a mineral abrasive selected from the group consisting of silicon dioxide or aluminum oxide, wherein the abrasive is in macrocrystalline or single crystalline form and has an average crystal size of about 1 to about 500 microns.

2. The composition of claim 1 wherein the mineral abrasive is an aluminum oxide.

3. The composition of claim 2 wherein the aluminum oxide is an electrofused aluminum oxide.

4. The coating composition of claim 1 wherein the mineral abrasive is a silicon dioxide.

5. The composition of claim 1 wherein the mineral abrasive is in the form of a single crystal.

6. The composition of claim 1 wherein the film-forming resin composition comprises a thermosetting resin.

7. The coating composition of claim 6 wherein the thermosetting resin comprises epoxy resins, acrylic resins, polyester resins, polycarbonate resins, melamine-formaldehyde resins, or polyurethane resins.

8. The coating composition of claim 7 wherein the thermosetting resins comprise a polymer crosslinked through the use of an aminoplast.

9. The composition of claim 1 wherein the film-forming resin composition comprises a UV-curable resin.

10. The composition of claim 9 wherein the UV-curable resin comprises olefin functional monomers or olefin functional oligomers or polymers.

11. The composition of claim 10 wherein the olefin functional oligomers or polymers comprise polyurethanes, cellulosic acrylic butyrates, nitrocellulosic polymers, polyesters, acrylic polymers, or blended or grafted combinations thereof.

12. The composition of claim 1 wherein the film-forming resin composition comprises a thermalplastic resin.

13. The composition of claim 12 wherein the thermalplastic resin comprises a nitrocellulose resin, an alkyd resin, a polyester resin, an acrylic resin, a vinyl acrylic resin, a styrene acrylic resin, a urethane, or a natural resin.

14. In a method of surface finishing comprising the steps of applying to a surface at least one sealer coating composition to form a sealer coat and one top coating composition to form a surface top coat, the improvement comprising using a sealer coating composition comprising the composition according to claim 1, wherein the surface finish has a clarity of about 70% or higher, as measured by the ASTM® E430 standard.

15. The improved method of claim 14 wherein at least two sealer coats are applied to the surface before the top coat is applied.

16. The improved method of claim 14 wherein the coating composition for the top coat comprises a film-forming resin composition and macrocrystalline or single crystalline mineral abrasive.

17. The improved method of claim 15 wherein the coating composition for the top coat comprises a film-forming resin composition and macrocrystalline or single crystalline mineral abrasive.

18. The improved method of claim 14 wherein the sealer coat or top coat is formed using a coating composition comprising a thermosetting resin.

19. The improved method of claim 18 wherein the thermosetting resin comprises epoxy resin, a polyurethane resin, a polyester resin, a polycarbonate resin, a melamine-formaldehyde resin, or an acrylic resin.

20. The improved method of claim 14 wherein the sealer coat or top coat is formed using a coating composition comprising a UV-curable resin.

21. The improved method of claim 20 wherein the UV-curable resin comprises olefin functional monomers or olefin functional oligomers or polymers.

22. The improved method of claim 21 wherein the olefin functional oligomers or polymers comprise polyurethanes.

23. The improved method of claim 14 wherein the mineral abrasive is an electrofused aluminum oxide.

24. The improved method of claim 23 wherein the aluminum oxide forms about 5 to about 20 percent by weight of the top coat.

25. The improved method of claim 14 wherein the surface is selected from the group consisting of a wood surface, a vinyl surface, a tile surface, a rubber modified cement surface, a marble surface, a metal surface, and a plastic surface.

26. An abrasion-resistant laminate comprising a base layer and at least one additional layer wherein the surface of said additional layer is finished with a coating composition according to claim 1.

27. A method of finishing the surface of a laminate comprising the step of applying to at least one layer of the laminate a coating composition according to claim 1.

28. A paper composition for forming an abrasion resistant surface of about 70% clarity or higher as measured by the ASTM® E430 Standard on a laminated composite said composition comprising paper impregnated or coated with a coating composition according to claim 1.

29. A coating composition for forming abrasion-resistant coatings of high clarity on a substrate, said coating composition comprising a film-forming resin composition and a mineral abrasive in macrocrystalline or single crystalline form, said abrasive has an average crystal size of about 1 to about 500 microns wherein said mineral abrasive forms about 5 to about 80 weight percent of the coating and wherein the coating composition exhibits about 70 percent clarity or higher measured according to the ASTM® E430 Standard.

* * * * *